March 5, 1940.     C. H. DOWNING     2,192,435
METHOD AND MEANS FOR SPECIFIC MECHANICAL
DETERMINATION OF BODILY EQUILIBRIUM
Filed Feb. 7, 1936
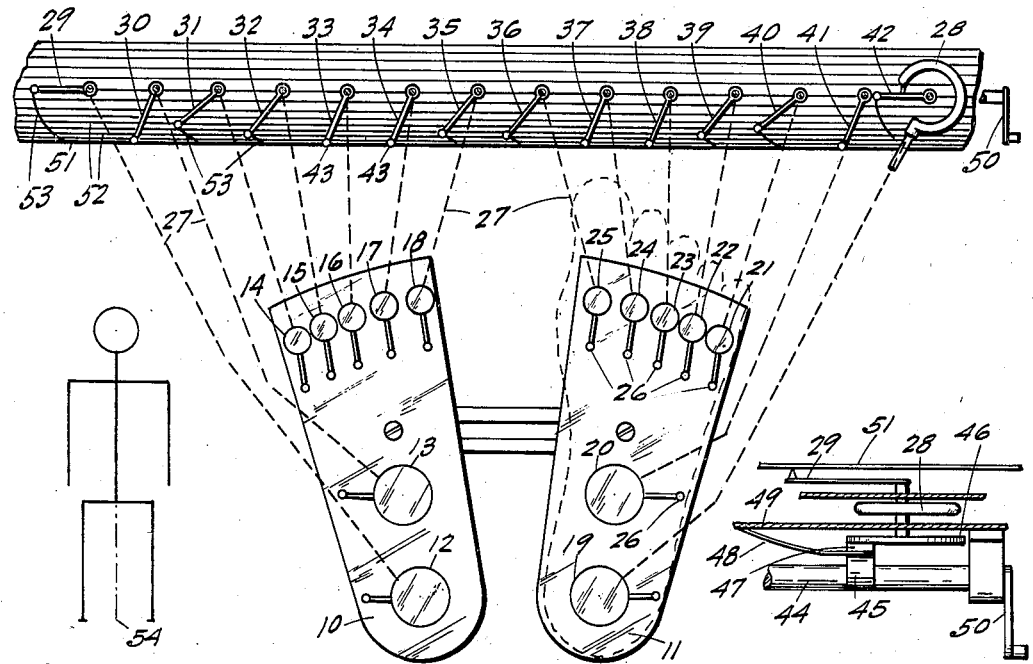
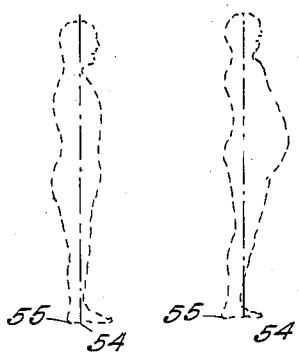
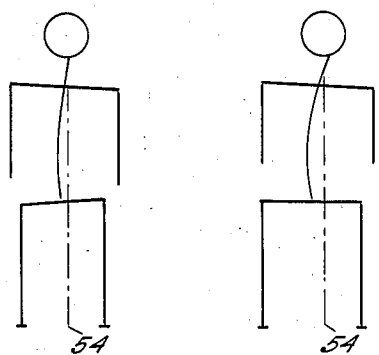
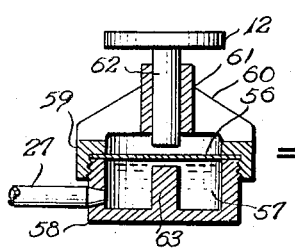
INVENTOR.
Carter Harrison Downing Patented Mar. 5, 1940

2,192,435

UNITED STATES PATENT OFFICE 2,192,435

METHOD AND MEANS FOR SPECIFIC MECHANICAL DETERMINATION OF BODILY EQUILIBRIUM

Carter Harrison Downing, San Francisco, Calif., assignor to Foot Balance, Inc., Danville, Ill., a corporation of Illinois Application February 7, 1936, Serial No. 62,830

2 Claims. (Cl. 128—2)

This invention, a method and means for specific mechanical determination of bodily equilibrium, concerns the equilibrium and balance of the human body as applied through the feet of the individual, and provides a method of determining various malformations throughout the system, through the medium of mechanical devices and comparisons.

This method readily determines, through inequality of weight distribution as compared to an average norm, various malformations, such as flat foot, fallen arches, short or long leg, dropped pelvis, spine curvature, and other structural faults, and thereby provides sound principles for devising methods for the correction of such faults.

The main object of the invention is to provide a method of determining static balance and equilibrium of an individual and the instant weight distribution as applied to the various supporting and support-related surfaces of the feet under this condition of equilibrium, and from the values obtained, ascertain the faulty functional and structural mechanics of the individual by comparison with values obtained under similar circumstances from an average norm.

Another object of the invention is to provide a method which will readily diagnose malformations or structural faults of the human frame.

A further object of the invention is to ascertain through values obtained in the foregoing objects, the apparent area or element of malformation or fault, and devise means for correcting such malformations or faults.

Other objects and advantages of the invention will become apparent as the following description is read on the drawing forming a part of this specification, and in which similar reference characters are used to designate similar parts throughout the several views, of which:

Fig. 1 is a diagrammatic view of apparatus suitable for carrying out this method.

Fig. 2 illustrates a type of brake for controlling the scribing indicators for instantaneous readings or graphs.

Figs. 3 to 7 are diagrammatic views showing a norm or normal human figure and other figures showing structural faults, and which views indicate the following:

Fig. 3, a norm, or body of normal structure and equilibrium, without structural faults or malformations, front view.

Fig. 4, same as Fig. 3, except side view.

Fig. 5, forward deflection of body in disturbed anterior-posterior equilibrium.

Fig. 6, disturbed lateral equilibrium due to inequality of leg lengths.

Fig. 7, disturbed lateral equilibrium due to pathologic processes, deformities, or variances in growth conformation of spinal or pelvic structures.

Fig. 8 is an enlarged sectional elevation through a fluid pressure transfer device, using a diaphragm in cooperation with a fluid for thrust transfer to the indicating devices.

This method consists in first having a plurality of individuals of normal balance and equilibrium, as also of structure, and in whom, through physical examination, no malformations or structural faults are discernible, and who are normal in weight in comparison to their height, and whose feet are also normal and without fault or malformation, submit to weight distribution determinations applied through the feet simultaneously in conjunction with instantaneous determination of such weight distribution, on a balance of suitable type, as described in the following, for the purpose of obtaining a "norm" or normal readings or graphs, as a medium of comparison with other cases to be diagnosed, and which other cases may then be diagnosed without any physical examination, but merely through camparison of their instant weight distribution with that of a norm. The instant readings of the balanced norms are averaged to obtain final values.

A weight or pressure distribution indicating or recording device of some suitable type is used for the purpose of conducting the diagnosis, and which device has incorporated therein two platforms, 10 and 11, each of which is adjustable spacedly and angularly, to support the person standing thereon in normal foot relation.

Each platform has a plurality of weight or pressure segregating elements or pads, and which are preferably in the form of adjustable pads 12 to 18 and 19 to 25, all of which may be adjusted about the pivots 26, to permit correct spacing for adaptation to the heel, instep, and metatarsal spacing of the individual when standing thereon in normal manner.

The pads are normally maintained in a common plane, and each platform is preferably provided with means (not shown) for adjusting each unit including the platform proper with its pads, above or below the common plane, and in angular relation to each other.

Each pad includes a diaphragm 56 acting on a fluid 57 which communicates through conduits 27 with respective fluid actuated or expansible elements 28 which actuate the respective scribing indicators 29 to 35 and 36 to 42, and all of which indicators are normally in zero position as shown at 43.

Means is provided for preventing actuation of any of the indicators while the person to be diagnosed is stepping onto or off the platforms, and for obtaining an instant reading or graph of the distributed weights, after the individual is on the balance and has assumed a comfortable standing posture.

This means consists of a brake, stop or lock, which in its simplest form includes a shaft 44 extending throughout the series of indicators, and has an eccentric 45 for cooperation with a disc 46 integral with each indicator arm, through a brake pad 47 which is fixed on one end of a leaf spring 48 which has its other end fixed to the indicator housing 49, and a lever 50 is fixed on one end of the shaft for control of the brake.

A chart 51 having longitudinal lines 52 ruled thereon, and which lines are properly spaced for direct scale readings of the indicator or scriber arms 29 to 42, is placed and secured in cooperative relation to the marking devices on said scriber arms.

In carrying out the method, after having obtained the set of normal calibrations from the average of a plurality of normal subjects, any other subject may be directly diagnosed by comparison with the norm.

It has been definitely demonstrated by such tests on a plurality of physically normal subjects of varying height, that the distribution of weight of the body is equal between the two feet, and distributed on each foot approximately in the following proportion: 60% on the heel (calcaneus); 30% on the heads of the fourth and fifth metatarsals; and 10% on the head of the first metatarsal.

Any variation from these values indicates malformation or imbalance, structural deformity, or postural defects.

The method of operation is as follows:

The platforms 10 and 11 are first adjusted to a normal plane, and with the proper spacing and degree of divergence to comfortably sustain the subject in a comfortable and normal posture. The pads are then adjusted to suit the specific spacing and location of heel, instep and metatarsals.

Lever 50 is then moved to position to lock all of the indicators in zero position, and the subject is then requested to step onto the balance and match their feet on the pads and to stand in their normal postural position.

As soon as the subject is apparently at ease, lever 50 is moved to release the indicators and almost immediately moved back to locking position, locking the indicators in their weight indicating position. It will be noted that the brake or lock mechanism coincidently locks all of the indicators. The subject may then step off the platforms without danger of changing the readings.

As the lever 50 is moved to release position, the scribers 29 to 42 simultaneously, through the medium of the pressures applied to the various pads, describe arcs 53, stopping on the chart at points relative to the pressures or weights applied to the associated pads, thus providing an instantaneous reading or graph of distributed weight on the various supporting surfaces or areas of each foot.

Moving the lever immediately back to locking position, locks all of the scribers in their final deflected positions and the subject is then permitted to step from the platform without the possibility of confusing the graph.

After these tests are completed, the graph is compared with the normal graph or standard.

In Fig. 5, disturbed anterior-posterior equilibrium may be due to foot imbalance, shortened muscle groups, pelvic inclination, or faulty postural mechanics, and will be indicated by variation in the heel and metatarsal readings from standard.

In Figs. 6 and 7, lateral equilibrium may be disturbed by inequality of leg lengths with single or double curvature of the spine; foot imbalance; faulty habitual posture without organic variances due to disease deformities or variation in structural conformation; pathologic processes, deformities or variances in growth conformation of spinal or pelvic structure.

Other variations may occur from other causes, such as obesity, hunch back, flat feet, corns or bunions, causing the area affected to be favored.

For instance, referring to Fig. 1, if the values of 29 and 42 be below the heel normal, and 31, 32, 35, and, 36, 39, 40 be above the metatarsal normal, anterior-posterior equilibrium disturbance (Fig. 5) is indicated, since the center of gravity of the body falls at a point 54, too far forward of the heel 55, throwing the weight forward on the toes.

With the weight registration of the two group units 29 to 35, and, 36 to 42, at variance, disturbance of lateral equilibrium is indicated.

Torsional curvature is indicated by variations both between the two feet, and between the heel and toe of each foot.

Pressure indications on 13, 20, 16, 17, 23 and 24 indicate fallen arches, callouses, or too much bodily weight for the arches to properly support.

Excess weight on, say 18 and 21 indicates lateral spine curvature or pelvic inclination.

It has been definitely ascertained that irrespective of the cause of imbalance, such cause will always produce the same characteristic variances in instantaneous readings or recordings of the pressures transmitted to the various supporting or support-related areas of the feet, and for the same malformation or fault, irrespective of the height or weight of the individual, the variances will always be proportionate.

Therefore, after standards have been adopted for normal and various abnormal structures and postures, the cause can be ascertained by comparison, and in other cases where no standards are available, the case may be diagnosed from the values obtained, when compared with the standard.

This method is also particularly adapted for use in conjunction with chiropractic and osteopathic adjustments and treatments, for the purpose of ascertaining the comparative value of the adjustments or treatments already conducted, and to indicate the further proper course of adjustments and treatments, and for this purpose, the chart and instantaneous reading may be dispensed with, and dial indicators substituted, whereby, after each adjustment or treatment, the degree of imbalance and direction of unbalanced thrust will indicate the proper course to pursue, to balance the physical structure of the patient.

As will be noted, this method is applicable to various types of physical deformities and posture, as also in connection with various bodily and structural adjustments and treatments, and may be used with the chart shown, for instantaneous and simultaneous weight-thrust values, or with weight indicating dials for direct, but not simultaneous reading.

The transfer device shown in Fig. 8 is merely typical, and does not, per se, form a part of the invention. In this thrust-transfer device, the diaphragm 56 is clamped to the top of the fluid container 58 by means of a threaded ring 59 which has integral brackets 60 supporting the bearing 61 in which the plunger 62 is slidably mounted. This plunger 62 has the pad 12, or any of the other pads 13 to 25 integral therewith or mounted thereon. The pillar 63 acts as a stop for the diaphragm, to prevent breaking of the diaphragm through overload. The thrust on the pad is transferred through the diaphragm to the fluid 57, which communicates with the indicating device through the tube 27.

It will be understood that variations in the method and the apparatus used, which variations are consistent with the appended claims, may be resorted to without detracting from the spirit or scope of the invention, or sacrificing any of the advantages thereof.

I claim:

1. Means for registering the instant response of a body in static equilibrium to the elemental force of gravity in terms of proportional weight thrusts comprising, a support for the heel and each metatarsal of each foot, and weight-responsive and weight-indicating means associated with each suport; friction securing means cooperatively related to all of said indicating means for securing and freeing said indicating means at will, to secure said indicating means in zero position until the body has attained a state of static equilibrium, to free all of said indicating means simultaneously for instant response and registration of the proportional weight thrusts as applied to the various supports, and to simultaneously secure all of said indicating means in instant and exact weight-thrust indicating position against disturbance of equilibrium of said body, said weight-indicating means comprising pressure-indicating gauges each having a pointer and a pivot therefor, a disk mounted on the pivot, a friction element cooperatively related to the disk, a shaft, a cam cooperatively related to each friction element and mounted on said shaft, and a crank for said shaft.

2. Means for registering the instant response of a body in static equilibrium to the elemental force of gravity in terms of proportional weight thrusts comprising, a support for the heel and each metatarsal of each foot, and weight-responsive and weight-indicating means associated with each support; friction securing means cooperatively related to all of said indicating means for securing and freeing said indicating means at will, to secure said indicating means in zero position until the body has attained a state of static equilibrium, to free all of said indicating means simultaneously for instant response and registration of the proportional weight thrusts as applied to the various supports, and to simultaneously secure all of said indicating means in instant and exact weight-thrust indicating position against disturbance of equilibrium of said body, said indicating means comprising a chart, and gauges having each a pointer provided with a scribing element cooperating with said chart, and a pivot for each pointer, a disk axially mounted on each pivot, a friction shoe cooperatively related to each disk and normally out of contact therewith, a shaft and a crank therefor, a cam cooperatively related to each shoe for urging the shoe to contact its related disk to secure the disk in its instant position and mounted on said shaft, whereby, when said crank is in one position, the shoes are all free of the disks and the gauges and pointers are free to operate without restraint, and when said crank is moved to another position, the cams urge the shoes to cooperate with and secure all of the discs in the instant position to secure the pointers and scribers against movement.

CARTER HARRISON DOWNING.